United States Patent
Rohrbach et al.

(10) Patent No.: US 6,706,092 B2
(45) Date of Patent: Mar. 16, 2004

(54) CHEMICAL/BIOLOGICAL DECONTAMINATION FILTER

(75) Inventors: Ronald P. Rohrbach, Flemington, NJ (US); Daniel E. Bause, Flanders, NJ (US); Gordon W. Jones, Wakefield, RI (US); Peter D. Unger, Convent Station, NJ (US)

(73) Assignee: AlliedSignal Inc., Morristown, NJ (US)

(*) Notice: Subject to any disclaimer, the term of this patent is extended or adjusted under 35 U.S.C. 154(b) by 0 days.

(21) Appl. No.: 10/125,616

(22) Filed: Apr. 17, 2002

(65) Prior Publication Data

US 2003/0196549 A1 Oct. 23, 2003

(51) Int. Cl.[7] ............... B01D 46/00; B01D 53/04
(52) U.S. Cl. ............... 95/90; 95/211; 95/285; 96/143; 96/153; 96/226; 96/296; 261/104; 261/107; 422/122
(58) Field of Search ............... 96/134, 143, 153, 96/154, 226, 227, 296, FOR 123, FOR 124; 55/385.2, 385.3, DIG. 33; 428/397, 398; 261/104, 107; 422/120, 122; 454/69; 95/90, 211, 285

(56) References Cited

U.S. PATENT DOCUMENTS

| | | | | |
|---|---|---|---|---|
| 4,867,770 A | * | 9/1989 | Feeney | ............ 96/137 |
| 5,057,368 A | | 10/1991 | Largman et al. | ............ 428/397 |
| 5,069,970 A | | 12/1991 | Largman et al. | ............ 428/373 |
| 5,310,784 A | | 5/1994 | Ide et al. | ............ 524/876 |
| 5,713,971 A | * | 2/1998 | Rohrbach et al. | ............ 96/181 |
| 5,744,236 A | | 4/1998 | Rohrbach et al. | ............ 428/372 |
| 5,759,394 A | * | 6/1998 | Rohrbach et al. | ............ 210/264 |
| 5,902,384 A | * | 5/1999 | Rohrbach et al. | ............ 96/296 |
| 5,951,744 A | * | 9/1999 | Rohrbach et al. | ............ 96/154 |
| 5,989,720 A | | 11/1999 | Taniyama | ............ 428/450 |
| 6,054,647 A | | 4/2000 | Ridener | ............ 174/35 MS |
| 6,328,775 B1 | * | 12/2001 | Fuchs | ............ 55/385.2 |
| 6,432,179 B1 | * | 8/2002 | Lobovsky et al. | ............ 96/296 |

FOREIGN PATENT DOCUMENTS

| | | |
|---|---|---|
| JP | 55-20624 A * | 2/1980 |
| SU | 1681912 A1 * | 10/1991 |

* cited by examiner

*Primary Examiner*—Frank M. Lawrence
(74) *Attorney, Agent, or Firm*—Roberts & Roberts, L.L.P.

(57) ABSTRACT

Modification, neutralization and/or decontamination of airborne biological and/or chemical contaminants from a breathable atmosphere by subjecting the breathable atmosphere to a filter which is formed from a plurality of polymeric multilobal fibers. These fibers include a central core with T-shaped lobes projecting therefrom, wherein each T-shaped lobe has a leg and a cap. The lobes define a longitudinally extending internal cavity between two adjacent legs that extends the entire length of the fiber. The filter is impregnated with a biological and/or chemical decontamination reagent for chemically modifying, neutralizing and/or decontaminating airborne biological and/or chemical contaminants from a breathable atmosphere. A filter projection preferably extends into an external reservoir containing a supply of biological and/or chemical decontamination reagent. This configuration increases the capacity and efficiency of the filter, and causes a lower pressure differential across the filter.

49 Claims, 9 Drawing Sheets

CHEMICAL/BIOLOGICAL DECONTAMINATION FILTER

BACKGROUND OF THE INVENTION

1. Field of the Invention

The present invention relates to the decontamination of chemical and biological warfare agents. The invention also relates to a process for removing chemical and/or biological contaminants from a breathable atmosphere. More particularly, the invention relates to a continuously self-regenerating filter system for removing chemical and/or biological contaminants from a breathable atmosphere.

2. Description of the Related Art

The threat of biological and chemical warfare has grown considerably in recent years. Highly dangerous biological and chemical warfare agents have been developed and stockpiled by several nations. Some of these potent biological agents include bacteria such as Bacillus anthracis (anthrax) and Yersinia pestis (plague); viruses such as variola virus (small pox) and flaviviruses (hemmorhagic fevers); and toxins such as botulinum toxins and saxitoxin. Examples of some potent chemical agents include blister or vesicant agents such as mustard agents; nerve agents such as methylphosphonothioc acid (VX); lung damaging or choking agents such as phosgene (CG); cyanogen agents such as hydrogen cyanide; incapacitants such as 3-quinuclidinyl benzilate; riot control agents such as orthochlorobenzylidene malononitrile (CS); smokes such as zinc chloride smokes; and some herbicides such as 2,4-D (2-4-dichlorophenoxyacetic acid).

Such biological and chemical warfare agents pose a significant risk to private citizens as well as to military personnel. For example, nerve agents are particularly toxic and are generally colorless, odorless, and readily absorbable through the lungs, eyes, skin, and intestinal tract. Even a brief exposure can be fatal and death can occur in as quickly as 1 to 10 minutes. Vesicant agents are known to burn and blister the skin or any other part of the body they contact, including eyes, mucus membranes, lungs, and skin. Biological agents such as anthrax are easily disseminated as aerosols and thus have the ability to inflict a large number of casualties over a wide area.

Known techniques for protecting humans from breathing-in hazardous substances include the use of respiratory masks, or gas masks as well as vehicle, room and building air filters. Protective masks are currently used by the military for protection against chemical and biological contaminants. Typically, such masks include a respiratory cup which fits over the user's mouth and nose, and is secured to the user's head. Such respiratory cups typically include a connection to an oxygen source, and a filter element containing a decontamination media for removing harmful substances from the air breathed in by the user.

However, this method suffers from several disadvantages. The usefulness of a respiratory mask only is dependent on the lifespan and efficiency of its filter element. Conventional decontamination filters are only useful for relatively short periods of time, i.e. 30 minutes or less, because there is a limit to the amount of decontamination media which they can hold. Thus, conventional decontamination filters are relatively inefficient, and frequently result in a relatively high pressure differential across the filter and the decontamination media of the filter. As a result, the use of very large quantities of decontamination media is the only satisfactory way in which to use these materials. However, the relative large pressure differential problem would still remain.

Thus, it would be desirable to devise a more efficient, higher capacity absorptive filter for the neutralization and/or decontamination of chemical and/or biological contaminants from a breathable atmosphere, which also provides a lower pressure differential. The present invention provides a solution to this problem.

According to the present invention, a filter for an individual, a vehicle, a room, a building, or the like, is provided which is formed from a plurality of polymeric multilobal fibers. These fibers include a central core having a plurality of T-shaped lobes projecting therefrom, with each T-shaped lobe having a leg and a cap. The lobes define a longitudinally extending internal cavity between two adjacent legs that extends the entire length of the fiber. The filter is impregnated with a biological and/or chemical decontamination reagent in an amount sufficient to chemically modify, neutralize, decontaminate, absorb, and/or adsorb airborne biological and/or chemical contaminants from a breathable atmosphere. The structure of the polymeric multilobal fibers allows the filter to hold more of the decontamination reagent than conventional filters can hold. This increases the removal capacity, affinity, and efficiency of the filter, and causes a lower pressure differential across the filter.

In another embodiment, the filter includes a wicking element which extends from the filter and extends into a reservoir which contains a supply of a biological and/or chemical decontamination reagent. The wicking element is capable of delivering the biological and/or chemical decontamination reagent from the reservoir to the filter, and replenishing the reagent consumed in the filter. Together, the wicking element and reservoir are capable of equilibrating the flow, level, and/or concentration of the biological and/or chemical decontamination reagent between the reservoir and the filter, thus extending the useful life of the filter and increasing its efficiency.

SUMMARY OF THE INVENTION

The invention provides an apparatus for chemically modifying, neutralizing and/or decontaminating chemical and/or biological contaminants from a breathable atmosphere, said apparatus comprising a filter which comprises a plurality of polymeric multilobal fibers, said fibers comprising a central core having a plurality of T-shaped lobes projecting therefrom, each of said T-shaped lobes having a leg and a cap, said lobes defining a longitudinally extending internal cavity between two adjacent legs that extends the entire length of the fiber; and which filter has been impregnated with at least one biological and/or chemical decontamination reagent in an amount sufficient to chemically modify, neutralize and/or decontaminate chemical and/or biological contaminants from a breathable atmosphere.

The invention also provides a self-regenerating filter system which comprises:

a) a filter which comprises a plurality of polymeric multilobal fibers, said fibers comprising a central core having a plurality of T-shaped lobes projecting therefrom, each of said T-shaped lobes having a leg and a cap, said lobes defining a longitudinally extending internal cavity between two adjacent legs that extends the entire length of the fiber; and which filter has been impregnated with at least one at least one biological and/or chemical decontamination reagent in an amount sufficient to chemically modify, neutralize and/or decontaminate chemical and/or biological contaminants from a breathable atmosphere;

b) a reservoir connected to the filter, which reservoir contains a supply of a biological and/or chemical decontamination reagent for replenishing the reagent of the filter;

c) a wicking element which extends from the filter into the reservoir and is capable of delivering a supply of a biological and/or chemical decontamination reagent from the reservoir to the filter; and d) an optional activated carbon component connected to the filter, which activated carbon component is capable of chemically modifying, neutralizing and/or decontaminating chemical and/or biological contaminants from a breathable atmosphere.

The invention further provides a process for chemically modifying, neutralizing and/or decontaminating chemical and/or biological contaminants from a breathable atmosphere, comprising the steps of:

a) providing a filter which comprises a plurality of polymeric multilobal fibers, said fibers comprising a central core having a plurality of T-shaped lobes projecting therefrom, each of said T-shaped lobes having a leg and a cap, said lobes defining a longitudinally extending internal cavity between two adjacent legs that extends the entire length of the fiber; and which filter has been impregnated with at least one biological and/or chemical decontamination reagent in an amount sufficient to chemically modify, neutralize and/or decontaminate chemical and/or biological contaminants from a breathable atmosphere;

b) passing a breathable atmosphere through the impregnated filter to thereby chemically modify, neutralize and/or decontaminate chemical and/or biological contaminants from the breathable atmosphere; and c) optionally passing the breathable atmosphere through an activated carbon component connected to the filter, which activated carbon component to thereby further chemically modify, neutralize and/or decontaminate chemical and/or biological contaminants from the breathable atmosphere.

The invention still further provides a process for chemically modifying, neutralizing and/or decontaminating chemical and/or biological contaminants from a breathable atmosphere, comprising the steps of:

i) providing a self-regenerating filter system which comprises:

a) a filter which comprises a plurality of polymeric multilobal fibers, said fibers comprising a central core having a plurality of T-shaped lobes projecting therefrom, each of said T-shaped lobes having a leg and a cap, said lobes defining a longitudinally extending internal cavity between two adjacent legs that extends the entire length of the fiber; and which filter has been impregnated with at least one biological and/or chemical decontamination reagent in an amount sufficient to chemically modify, neutralize and/or decontaminate chemical and/or biological contaminants from a breathable atmosphere;

b) a reservoir connected to the filter, which reservoir contains a supply of a biological and/or chemical decontamination reagent for replenishing the reagent of the filter;

c) a wicking element which extends from the filter into the reservoir and is capable of delivering a supply of a biological and/or chemical decontamination reagent from the reservoir to the filter; and d) an optional activated carbon component connected to the filter, which activated carbon component is capable of chemically modifying, neutralizing and/or decontaminating chemical and/or biological contaminants from a breathable atmosphere;

ii) passing a breathable atmosphere through the impregnated filter and optionally through the activated carbon component, if present, to thereby chemically modify, neutralize and/or decontaminate chemical and/or biological contaminants from the breathable atmosphere;

iii) replenishing the reagent of the filter by equilibrating the flow, level, or concentration of the biological and/or chemical decontamination reagent between the reservoir and the filter via the wicking element; and iv) optionally repeating steps (ii) and/or (iii) until the biological and/or chemical decontamination reagent of the reservoir has been exhausted.

DETAILED DESCRIPTION OF THE PREFERRED EMBODIMENT

Figure 1:
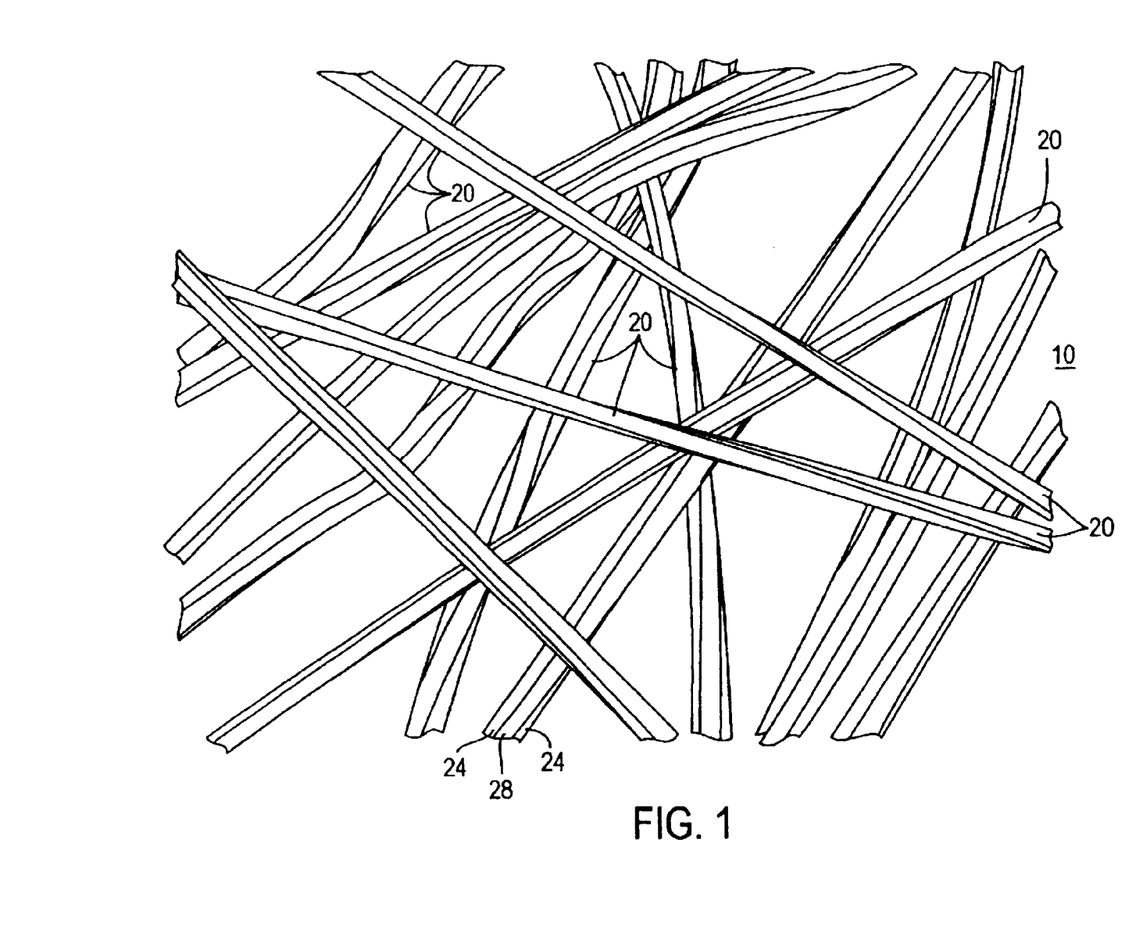
FIG. 1 shows a non-woven arrangement of a plurality of multilobal fibers.
Figure 2:
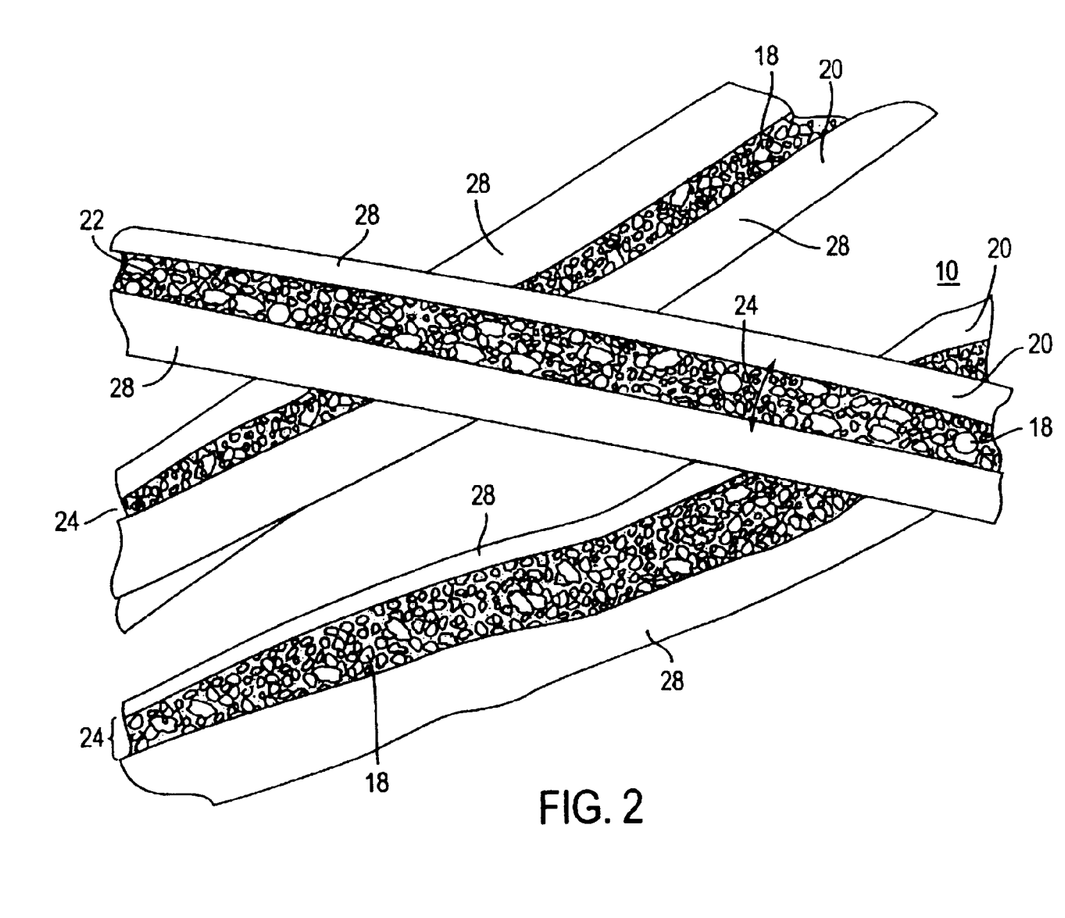
FIG. 2 shows a non-woven arrangement of a plurality of multilobal fibers having biological and/or chemical decontamination reagent powder particles infused inside the cavities between adjacent T-shaped lobes.
Figure 3:
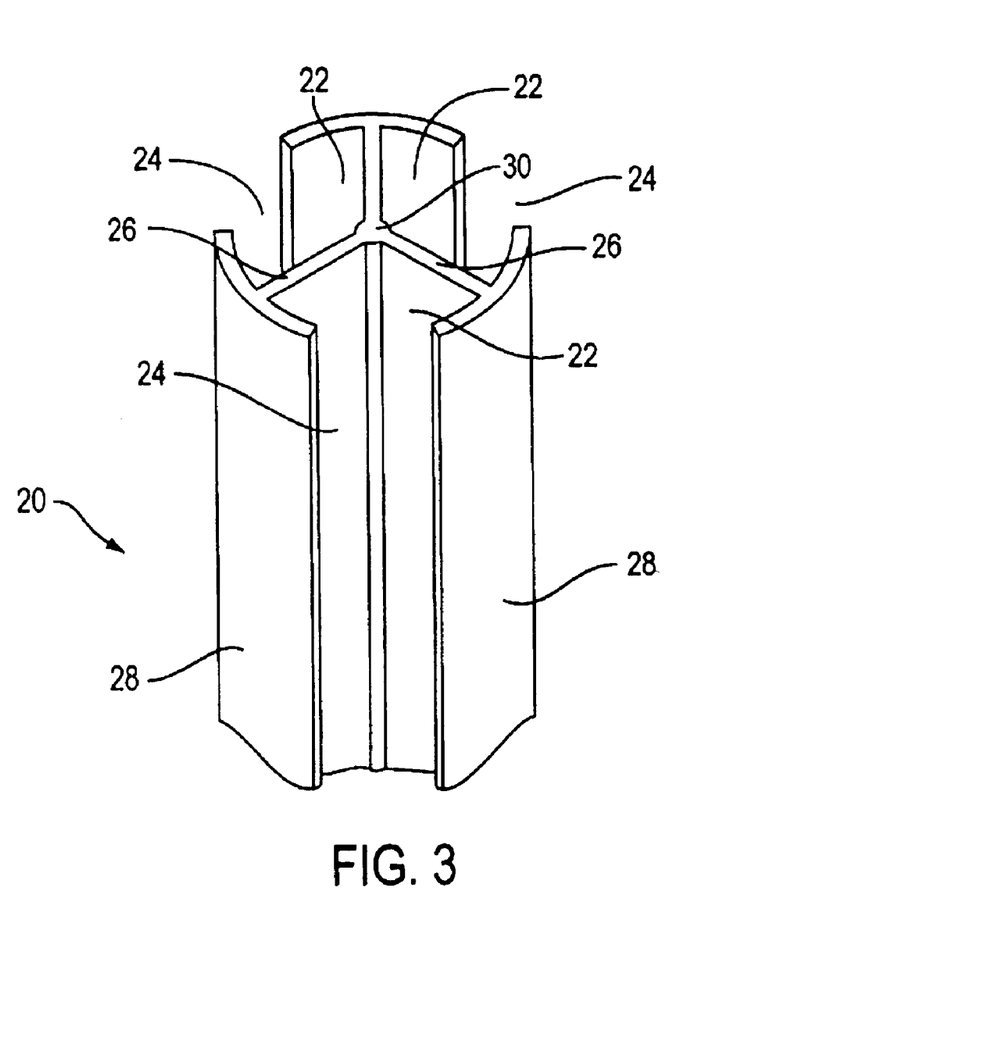
FIG. 3 shows a perspective view of a multilobal fiber having three T-shaped lobes with curved caps.

The invention relates to a technique for removing airborne biological and/or chemical contaminants from a breathable atmosphere. According to the invention, a plurality of polymeric multilobal fibers are provided. The fibers of this invention preferably comprise trilobal fibers. Such fibers are shown in FIGS. 1–3. FIG. 3 shows a trilobal fiber 20, also known as a "triad", having three T-shaped lobes projecting from a central fiber core 30. Multilobal fibers having this structure are described in U.S. Pat. Nos. 5,057,368 and 5,744,236 which are incorporated herein by reference. As seen in FIG. 3, each of the T-shaped lobes comprises a leg 26 and a cap 28. These caps 28 may be curved, as seen in FIG. 3, or they may be straight. Other known multilobal fibers are quadrilobal, hexalobal, pentalobal, tetralobal, and octalobal filament fibers, and are described in U.S. Pat. No. 5,069,970 which is incorporated herein by reference. However, these are less preferred for the purposes of this invention because they limit the amount of space available for infusion of biological and/or chemical decontamination reagent powder particles that are incorporated as part of the invention.

Between two adjacent lobes is formed a cavity 22 and extending from each cavity 22 is a long longitudinal opening 24 that extends along the entire length of the fiber 20. The angle of separation between adjacent legs 26 may vary widely and depends on the number of lobes. Preferably, the legs 26 are separated from each other by an angle of from about 80° to about 130°. In the three lobed embodiment of FIG. 3, the angle of separation of legs 26 is from about 110° to about 130°, more preferably from about 115° to about 125°, and most preferably by about 120°.

The length and width of the legs 26 and caps 28 of the T-shaped lobes may vary widely. In general, the length of each leg 26 is selected such that the caps 28 of adjacent T-shaped lobes do not contact each other to form an enclosed tube like structure. Otherwise, only a minimal amount of the decontamination agent would make it into the cavities 22. Usually, the length of each leg 26 is from about 4.5 to about 890 μm and the width of leg 26 is from about 0.5 to about 90 μm. In the preferred embodiments of the invention, the average length of each leg 26 is from about 4.5 to about 100 μm, more preferably from about 4.5 to about 50 μm, and most preferably from about 4.5 to about 25 μm. Preferably the average width of each leg 26 is from about 0.5 to about 80 μm, more preferably from about 0.5 to about 60 μm, and most preferably from about 0.7 to about 40 μm. The length of cap 28 is preferably from about 4.5 μm to about 1600 μm. More preferably, the length of each cap 28 is from about 4.5 μm to about 120 μm, and even more preferably from about 4.5 μm to about 75 μm. The width of each cap 28 is preferably from about 0.5 μm to about 90 μm, more preferably from about 0.5 μm to about 80 μm, and even more preferably the width is from about 0.5 μm to about 60 μm. In the most preferred embodiment of the invention, the length of each cap 28 is from about 4.5 μm to about 50 μm and the width of each cap 28 is from about 0.7 μm to about 40 μm.

The length of cap 28 of any fiber will depend on the length and width of legs 26 of each T-shaped lobe and the width of cap 28. For example, in general, the longer leg 26 of a lobe, the longer the permissible length of cap 28 becomes. Conversely, the shorter the leg 26, the shorter the permissible length of cap 28. The length of leg 26 and cap 28 of adjacent T-shaped lobes are selected such that a T-shaped lobe forms and such that caps 28 of adjacent T-shaped lobes do not intersect. The relationship between the length and width of the legs 26 and the length and width of caps 28 is more adequately described in U.S. Pat. No. 5,057,368 mentioned above.

The polymeric fibers 20 preferably comprise a thermoplastic polymer capable of being spun into a fiber, including polyamides, polyesters and polyolefins and blends thereof. Preferably, the polymer is formed into a polymer melt and then extruded and spun into fibers 20 having the desired shape and form. The fibers 20 may then be arranged into a filter 10 that may be either woven or non-woven. FIG. 1 illustrates a non-woven filter 10 of the invention which is formed by fibers 20 which are arranged in random order. Such filters may be present in any suitable shape or size, and may be used in a variety of applications, including personal protection applications such as respiratory masks, and collective protection applications, such as vehicle or tank air decontamination systems, building air decontamination systems, and the like. It is preferred that the filter is suitably shaped for its predetermined application.

According to the invention, the filter 10 is impregnated with at least one biological and/or chemical decontamination reagent. The decontamination reagent serves to chemically modify, neutralize and/or decontaminate chemical and/or biological contaminants in a breathable atmosphere, such as air. The biological and/or chemical decontamination reagent is preferably impregnated in the filter in an amount sufficient to chemically modify, neutralize and/or decontaminate chemical and/or biological contaminants in the breathable atmosphere which is passed through the filter. The biological and/or chemical decontamination reagent may be impregnated into the filter in the form of a solid, liquid, gas, vapor, or any other phase, and in combinations thereof. In one preferred embodiment, the biological and/or chemical decontamination reagent is impregnated into the filter fibers in the form of a liquid. In a preferred embodiment, the biological and/or chemical decontamination reagent is impregnated into the filter fibers in the form of particles such as powder particles.

As shown in FIG. 2, biological and/or chemical decontamination reagent powder particles 18 are infused both between said arranged fibers 20 and within cavities 22 of the fibers. This is preferably done without the use of adhesives. The biological and/or chemical decontamination reagent powder particles 18 are preferably present at a suitable size, shape and makeup that they may be securely retained within the cavities 22. Such decontamination reagent powder particles preferably range in size from about 1 nanometer to about 100 micrometers in diameter, more preferably from about 0.1 micrometer to about 50 micrometers in diameter, and most preferably from about 1 micrometer to about 10 micrometers in diameter.

Examples of suitable biological and/or chemical decontamination reagents nonexclusively include adsorbents such as activated carbon, zeolites, agar/agarose hydrogel imbibed with alkali such as sodium hydroxide, potassium hydroxide, and ammonium hydroxide; acids; bases such as alkalis or ammonia compounds, sodium phosphate; deliquescing agents such as lithium chloride, polymethioine, cyanogen bromide, immobilized acetylcholinesterase; organometallic catalysts such as copper/cobalt; enzymes with regenerable cofactors such as nucleophilic oximes and butyrylcholinestrerase. Other suitable decontamination reagents nonexclusively include cyanide carbonyls, carbonimides, substituted phosphoric acid, esters, thioethers, nitrogen heterocycles, olefinics, oxidizing agents such as peroxides, peracetates, perborates, sodium permanganate, potassium permanganate, calcium hypochlorite, calcium oxide, detergents and surfactants, quaternary ammonium complexes such as benzyltrimethyl ammonium chloride and ethyl ammonium chloride, zinc chloride, iron sulfate, sulfuric acid, phosphoric acid, and titanium dioxide, and photoreactive reagents or photochemical agents or such as anatase titanium dioxide. The decontamination reagent may comprise one or more suitable solvents as determined by those skilled in the art, such as water, alcohols, phenol, ethanol, diethylenetriamine, and ethylene glycol monomethyl ether.

In a preferred embodiment, the biological and/or chemical decontamination reagent comprises a photochemical agent or photoreactive reagent which is impregnated into the filter. According to this embodiment, a reaction is initiated by illumination with a light source, causing a photochemical reaction which yields products that are lethal to microorganisms, and/or capable of reacting with and deactivating chemical agents.

In one preferred embodiment, activated carbon powder particles are impregnated within the fibers 20 of the filter 10. Such activated carbon powder particles preferably range in size from about 1 nanometer to about 100 micrometers in diameter, more preferably from about 0.1 micrometers to about 50 micrometers in diameter, and most preferably from about 1 micrometer to about 10 micrometers in diameter. The efficiency of a filter having micron sized powdered carbon can be expected to be higher than in filters using more traditional granular carbon particles. This characteristic will provide a greater safety margin of protection for the user.

In the practice of the present invention, a breathable atmosphere is passed through the filter 10 which has been impregnated with the biological and/or chemical decontamination reagent. Such may be done, for example, by passing a stream of air through the filter 10. This action serves to chemically modify, neutralize and/or decontaminate chemical and/or biological contaminants from the breathable atmosphere. Such may be done by absorption, adsorption, or any other means suitable for neutralizing and/or removing such airborne contaminants from the breathable atmosphere.

Figure 4:
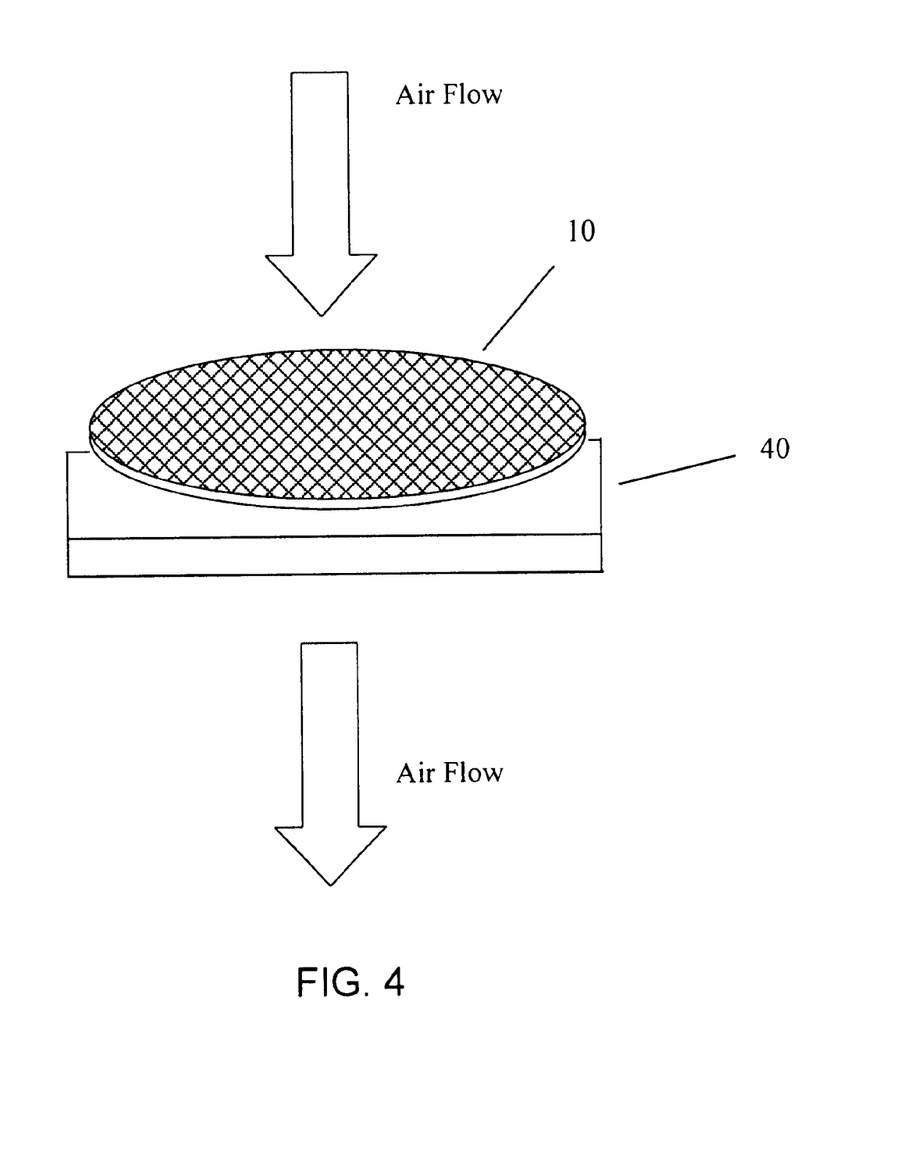
FIG. 4 shows a perspective view of an apparatus of the invention wherein the filter is connected to a carbon bed.
Figure 5:
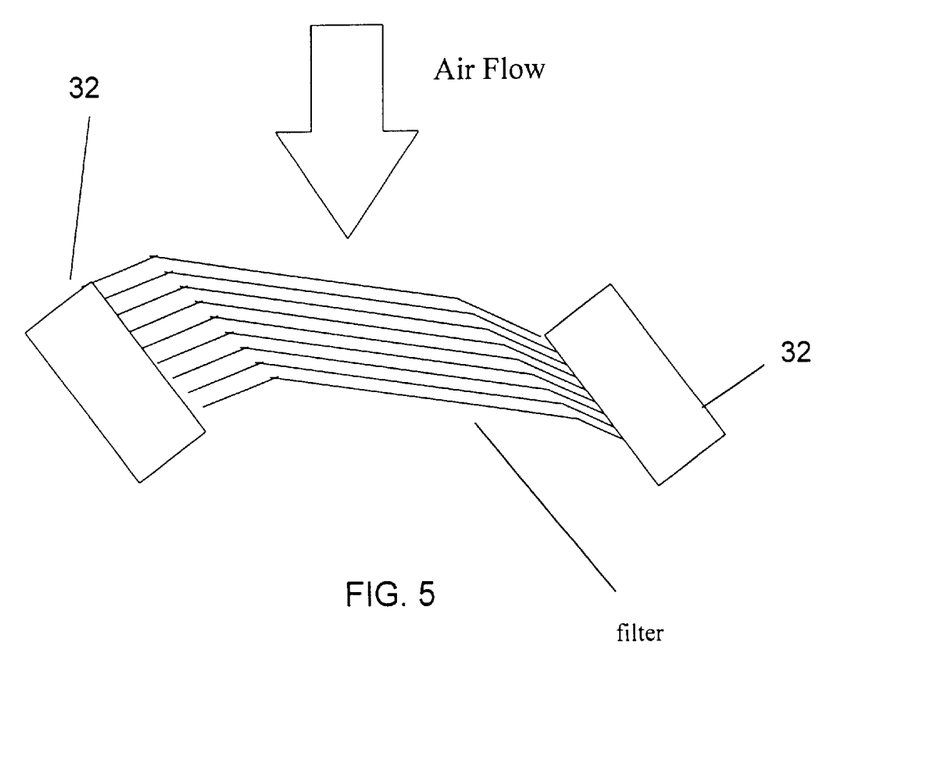
FIG. 5 shows a perspective view of a filter of the invention which comprises a wicking element.
Figure 6:
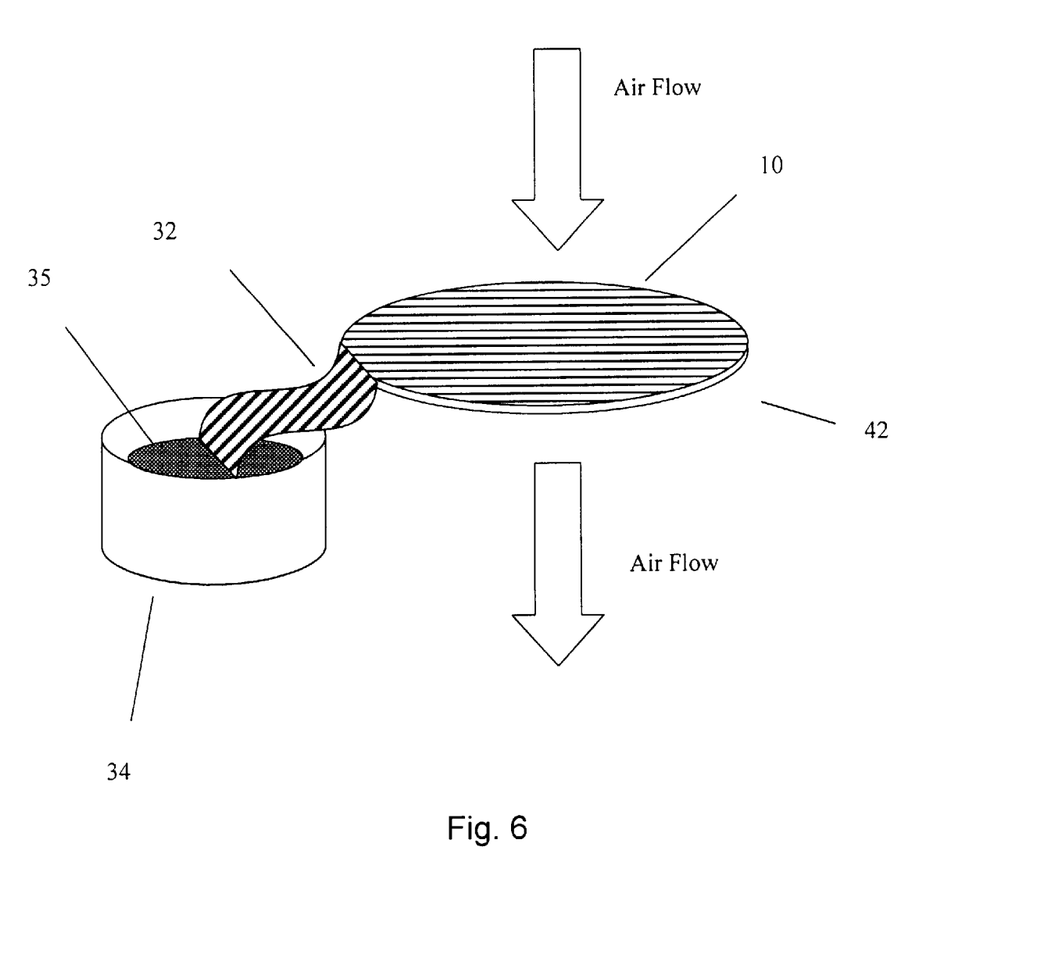
FIG. 6 shows a perspective view of a filter of the invention having a wicking element which extends into a reservoir containing a supply of a biological and/or chemical decontamination reagent.
Figure 7:
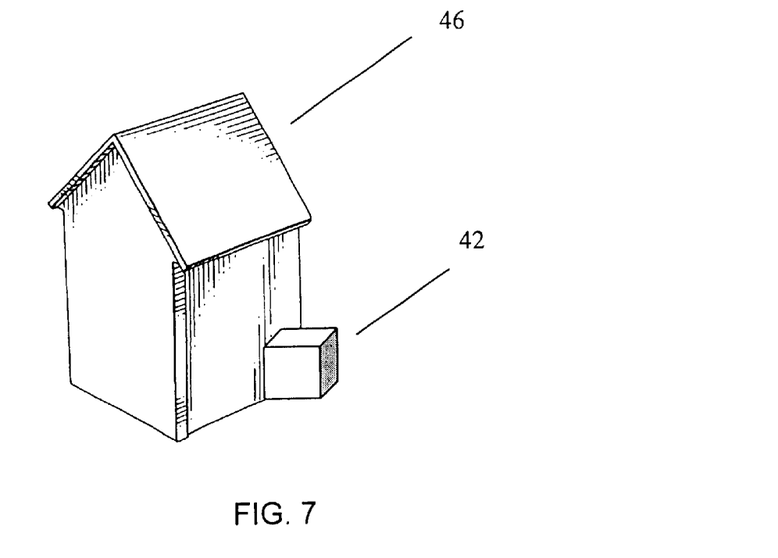
FIG. 7 shows a schematic view of a filter system of the invention which is connected to a building.
Figure 8:
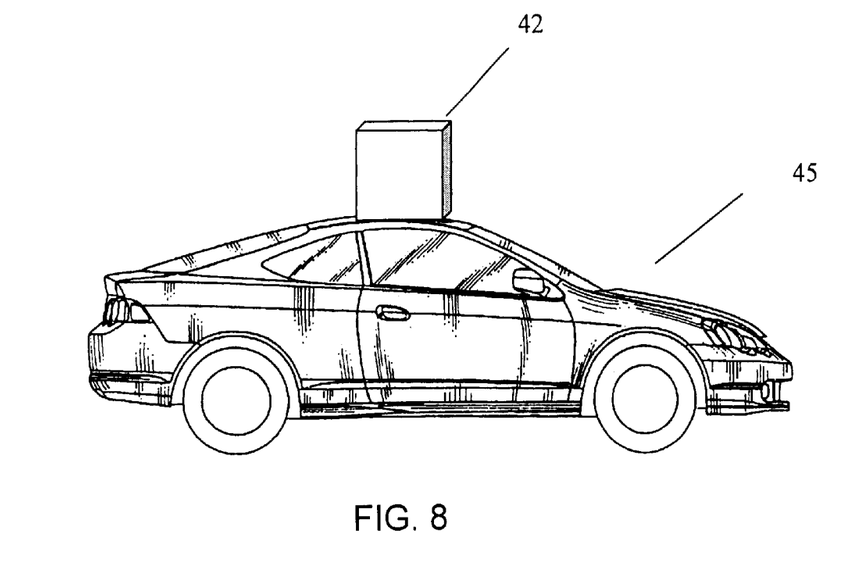
FIG. 8 shows a schematic view of a filter system of the invention which is connected to a vehicle.
Figure 9:
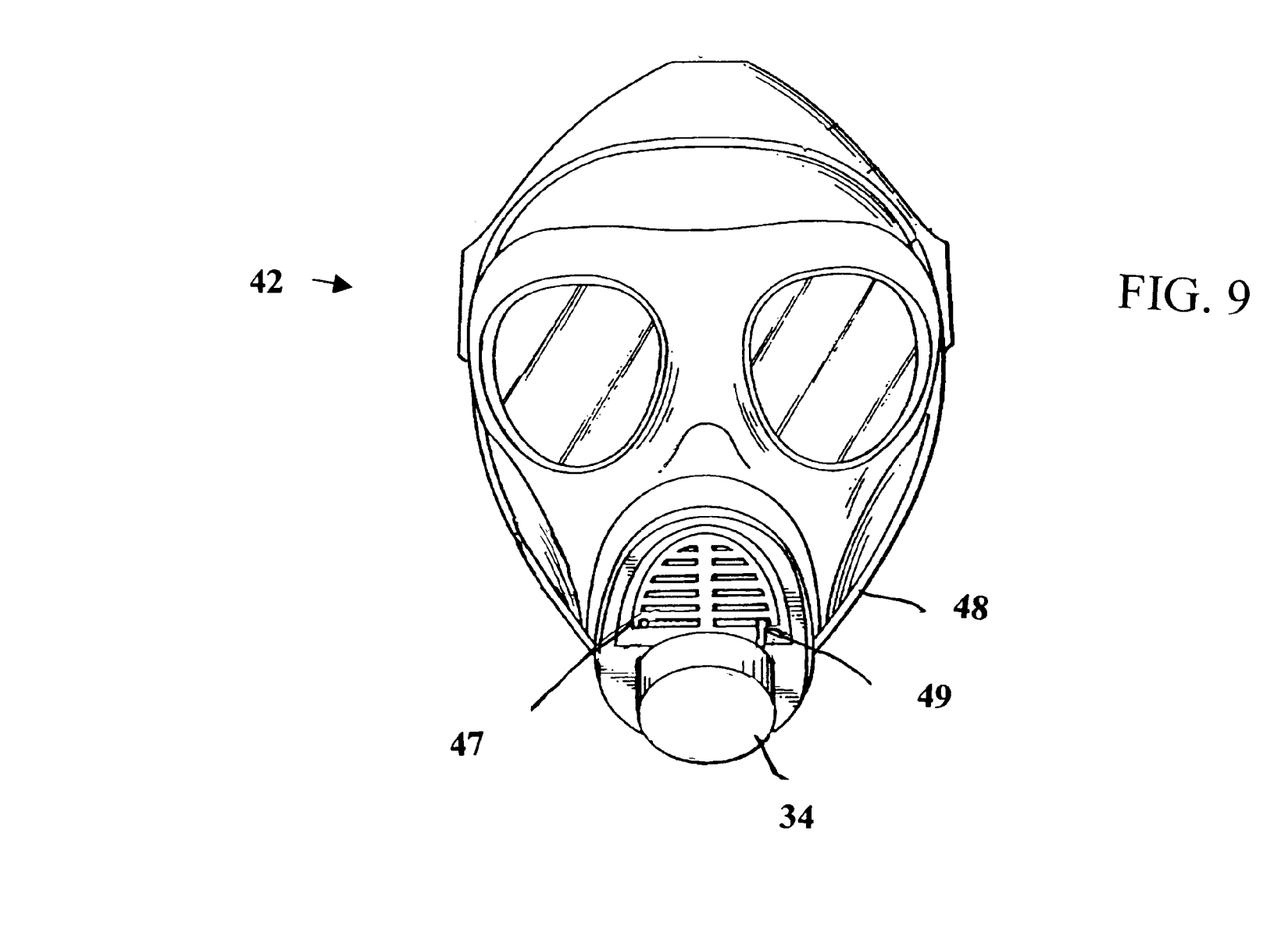
FIG. 9 shows a front view of a gas mask according to the invention.
Figure 10:
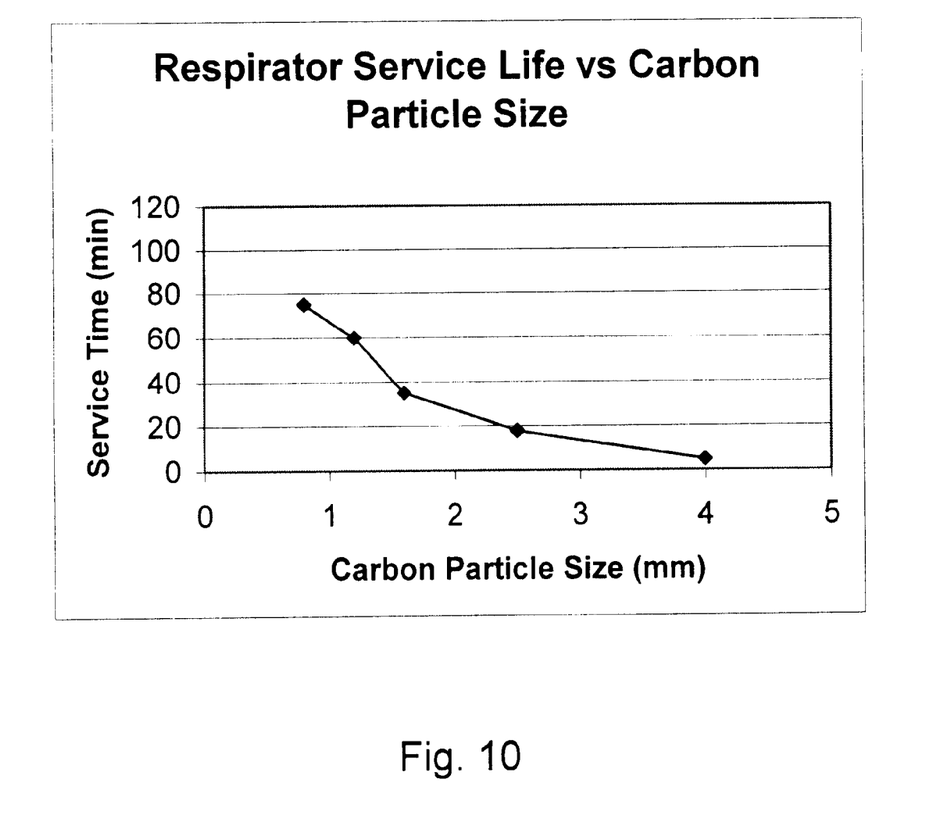
FIG. 10 shows a graph plotting the service life of respirators for different particle size carbons.

The breathable atmosphere may optionally but preferably be further passed through an activated carbon component. This action also serves to further chemically modify, neutralize and/or decontaminate chemical and/or biological contaminants in the breathable atmosphere. As shown in FIG. 4, the optional activated carbon component 40 is preferably connected to the filter 10 of the invention. Preferably, the activated carbon component 40 comprises activated carbon granules in a carbon bed. Such are known in the art. Preferably, the activated carbon granules are present in such a component at a size ranging from about 0.1 micrometer to about 100 micrometers, more preferably from about 1 micrometers to about 10 micrometers.

In an alternative embodiment, shown in FIGS. 5 and 6, a continuously self-regenerating filter system 42 is formed to remove airborne biological and/or chemical contaminants from a breathable atmosphere. This embodiment uses the wicking properties of polymeric multilobal fibers to transport a reactive and/or sorptive biological and/or chemical decontamination reagent to the filter from a remote offline reservoir. Such as system has a potentially limitless capacity. In this embodiment, a filter 10 is provided which comprises polymeric multilobal fibers, as described above. The filter 10 of this embodiment is preferably formed from such multilobal fibers which are placed in a parallel array, as shown in FIG. 5.

The filter 10 is impregnated with at least one biological and/or chemical decontamination reagent in an amount sufficient to chemically modify, neutralize and/or decontaminate chemical and/or biological contaminants in a breathable atmosphere. Such is described in detail above. Optionally but preferably, activated carbon powder particles may also be impregnated within the multilobal fibers of the filter 10. Such activated carbon powder particles are described in detail above.

The filter system 42 further comprises at least one wicking element 32 comprising the same or similar multilobal fibers as the filter 10. The wicking element 32 may be formed into any shape or size deemed suitable by one skilled in the art. The wicking element 32 extends from the filter 10 and into a reservoir 34, shown in FIG. 6, which reservoir 34 contains a supply of a biological and/or chemical decontamination reagent 35. The wicking element 32 is capable of delivering at least a portion of the biological and/or chemical decontamination reagent from the reservoir 34 to the filter 10. The reservoir is preferably located outside of the field of flow of a breathable atmosphere which is to be passed through the filter 10. The reservoir 34 preferably comprises a container of any suitable shape and size such that the reservoir is capable of containing any amount of biological and/or chemical decontamination reagent. In one preferred embodiment, the reservoir 34 is present at a size capable of holding less than 1 liter of liquid. In another preferred embodiment, the reservoir 34 is present at a size capable of holding thousands of liters of liquid. In a most preferred embodiment, the reservoir 34 is present in the form of a removable cartridge.

The wicking element/reservoir arrangement allows the fibers of the wicking element 32 to reversibly deliver biological and/or chemical decontamination reagent to the filter 10 and also carry away spent decontamination reagent, due to concentration gradients, from the filter. This results in the formation of a filter system with a low pressure drop (preferably less than about 0.05 inches of water) and large reagent capacity.

The presence of the reservoir component also allows for the formation of a more compact breathing device, since the bulk of the decontamination reagent would now reside outside of the filter. In a preferred embodiment the external reservoir is incorporated into an exchangeable cartridge. Thus, the capacity of the inventive filter system is limited only by the size of the reservoir, which is preferably located outside of the field of flow, and an unlimited filter life is possible.

Suitable biological and/or chemical decontamination reagents with preferred wicking properties nonexclusively include chemisorptive reactive agents such as alkali, and other reagents suitable for maintaining certain catalytic activity. Certain esterases become inhibited shortly after exposure to chemical warfare agents and subsequently can be reactivated with certain oximes. Regeneration of the filter is also continuously possible by optionally placing a nucleophilic oxime reactivating agent into the reservoir. Examples of other reactivating agents nonexclusively include those listed above as decontamination reagents.

Optionally but preferably, the continuously self-regenerating filter system may also comprise an activated carbon component 40 attached to the filter 10, which activated carbon component 40 is capable of chemically modifying, neutralizing and/or decontaminating chemical and/or biological contaminants in a breathable atmosphere. Such activated carbon components are shown in FIG. 4 and described above in detail.

The present invention is particularly suited for chemically modifying, neutralizing and/or decontaminating chemical and/or biological contaminants in a breathable atmosphere. The filters and filter systems of the invention may be used with commercially available respiratory masks, canisters, building filtration systems, vehicle filtration systems, and the like. In one embodiment, a filtration arrangement for a building is provided, which building has a breathable atmosphere, the arrangement comprising a filter system as described above which is connected to or positioned within the building. FIG. 7 shows a filter system 42 of the invention which is connected to a building 46. In another embodiment, a filtration arrangement for a vehicle is provided, which vehicle has a passenger compartment containing a breathable atmosphere, the arrangement comprising a filter system as described above which is connected to or positioned within the passenger compartment. FIG. 8 shows a filter system 42 of the invention which is connected to a vehicle 45.

Another preferred embodiment, shown in FIG. 9, includes a filter system 42 of the invention in the form of a gas mask 48. A filter is located within the gas mask 48, behind an air portal 47. A reservoir 34, containing a supply of a biological and/or chemical decontamination agent, is present in the form of a removable cartridge which is attached to the mask 48 such that the reservoir 34 is connected to the filter via a wicking element 49, which extends from the reservoir 34 to the filter within mask 48. The wicking element 49 is capable of delivering the supply of biological and/or chemical decontamination reagent from the reservoir 34 to the filter within the mask 48.

The following non-limiting examples serve to illustrate the invention. It will be appreciated that variations in proportions and alternatives in elements of the components of the invention will be apparent to those skilled in the art and are within the scope of the present invention.

EXAMPLE 1

Carbon Based System:

A comparison was made using as a reference point for the conventional granular carbon canister a 2 inch wide ½ inch deep bed filled with 3 mm granular carbon, containing approximately 6.6 g of granular carbon.

High Loft Triad Powder Carbon Media

Triad media fibers were compared using a high loft nonwoven media that was impregnated with powdered activated carbon at <400 mesh. The effective service time was calculated under two circumstances: 1) equivalent foot print and 2) equivalent pressure drop. In the second case the size of the triad/carbon bed was increased (almost 2× in depth) to achieve an equivalent pressure drop for this calculation. Using data published from Kirk Othmer, Vol A 5. p. 124 a plot of service life of respirators for different particle size carbons was obtained (see FIG. 10). From this the "benefit factor" was calculated for using finer particles sizes.

About a 100 min service time was extrapolated using an average particle size of the powder of 0.05 mm. Using 3 mm for the granular size with a 15 min service time the "benefit factor" ratio is 6.6. Based on carbon powder loadings of this high loft media of around 0.4 grams, and upon applying the benefit factor, the effective carbon loading is still considerably below that of the granular bed. Thus there would be no benefit to use the high loft media.

Low Loft Triad Powdered Carbon Depth Filter

A more conventional thinner filter triad media is then used, which is carbon powder impregnated and which has a thin single layer of large granular particles on the top. This material was pleated to roughly 4 pleats/inch, and achieved 9.29 grams of effective carbon. This exceeds the 6.6 grams in the conventional canister and represents a 30% improvement.

EXAMPLE 2

Liquid Reagent System:

A filter comprising a linear array of triad fibers was impregnated with a liquid decontamination reagent and connected to a reservoir of that reagent. The reagent employed had broad activity for the range of chemical warfare agents. The linear array filter has a configuration, as shown in FIGS. 5 and 6, which significantly improves the overall capacity over traditional fixed bed adsorbents systems. In a continuous reservoir system the capacity function is separated from the filtration function. Based on the triad fiber's ability to hold and wick liquid reagents, reagent is in continuous contact with both the reservoir and the contaminated air flow. This allows the liquid reagent, through concentration gradients and diffusion, to continually reequilibrate the exposed fiber surface with fresh reagent. Thus, one achieves with this design a low pressure drop filter which has a potentially long life compared to the solid adsorbent canister technique. The life/capacity of such a system is governed by the size of the reservoir. Further, the reservoir is located outside of the air flow, in contrast to a conventional canister where the entire capacity is located in the air flow. In conventional canister beds there is a trade-off between life and pressure drop. However, with this invention, these two functions are separated in location, and are independent of each other, providing a lower weight, longer lasting, smaller footprint molecular filter with a lower pressure drop.

EXAMPLE 3

To illustrate how some other oxidants perform in comparison to hydrogen peroxide, the following data which were collected for a short residence time filter is provided. Several 1.5 mm thick triad filters were each impregnated with a decontamination reagent, either hydrogen peroxide or sodium permanganate, employing a contaminant challenge of 400 ppb hydrogen sulfide environment with a 4 millisecond residence time.

| Oxidant | Breakthrough | Time |
|---|---|---|
| Hydrogen Peroxide | 78% | 30 min |
| Sodium Permanganate | 0% | 60 min |

The data shows that one can achieve rapid degradation kinetics by tuning the decontamination reagent.

EXAMPLE 4

Commercial gas mask filters typically incorporate two canisters, each with a face opening of about 6 cm and a depth of as much as 8.33 cm. The combined face area of such a filter is about 56.5 $cm^2$. These dimensions were used in calculating filter residence times, face velocities and media loading.

Values for the minute respiratory volume of a young adult male were taken to be 6 liters per minute (A. C. Guyton, 'Textbook of Medical Physiology', 5th Ed., p. 523, W. B. Saunders Co., 1976). This value was used to determine filter face velocity and residence time requirements of a mask filter.

Adsorption

Breakthrough performance data using toluene were used to estimate useful lifetimes and bed requirements, because we have no breakthrough data using dimethylmethyl phosphonate (DMMP) as the challenge compound. It should be noted that the boiling point of DMMP is significantly higher than that of toluene (181° C., vs. 110° C.). Carbon adsorption capacity typically increases with boiling point.

The toluene breakthrough data were performed at a challenge concentration of 5 ppm at 50% relative humidity, and at a face velocity of 37 feet per minute (FPM). Test filters were made from nonwoven wicking fiber (1.5 oz./sq.yd., 3 denier per filament) impregnated with very finely divided activated carbon powder (<10 micron). The final impregnated filter was approximately 1.5 mm thick. The residence time of the challenge gas within the filter was about 8 msec. Despite this brief residence time, the filter was able to treat the 5 ppm challenge level to non-detectable levels for a period of greater than 7.5 minutes (clearance period). The total toluene dynamic capacity was about 0.41 g toluene adsorbed per gram of carbon present on the filter.

Results:

A filter with multiple layers of impregnated wicking fiber was designed to fit within the physical dimensions for commercial gas vapor removal mask filters. A filter face velocity of about 3.5 FPM would result, given the face area listed above and a minute respiratory volume of 6 liters per min. The residence time of a challenge gas within the filter device at this flow rate is approximately 2.82 sec, or more than 2 orders of magnitude more than in a real-world toluene example described above. Thus a minimum clearance period of approximately 2600 minutes (43.3 hrs.) at a challenge level of 5 ppm is expected, assuming a linear relationship between residence time and clearance period. Empirical evidence indicates that for every doubling of residence time, a three-fold advantage is gained in initial uptake performance. Applying this factor, a clearance period of 3900 minutes (65 hrs) is expected. The capacity utilization (before detectable breakthrough) of about 30% is expected. A filter of the dimensions stated above would contain a total media mass of 14 grams (0.031 lbs), net filter support and housing.

Conclusions:

A light weight filter with excellent performance is achieved using micron size particles of activated carbon immobilized within a wicking fiber support. Also, a non-woven wicking fiber material formed according to the invention demonstrates a low air flow resistance. Such a filter exhibits a pressure drop of less than about 0.05 inches of water. The efficiency of such filter, due to its micron sized powdered carbon, is much higher than in filters using granular carbon particles. Such provides a greater safety margin of protection for the user.

EXAMPLE 5

Stoichiometric Fixed Bed Chemisorption

A lifetime of several days may be achieved using caustic solutions impregnated within the wicking fiber. A high degree of oxidative activity, at high pH values, may be maintained for months under conditions of exposure to ambient outside air and temperature.

Strong alkali (saturated NaOH), and calculate the total capacity assuming known values for fiber reagent loading, and using the filter dimensions as stated above. The total impregnated media weight is about 124 grams, and contains approximately 1.17 moles of alkali. With an exposure level of 5 ppmv at a flow rate of 6 liters per minute, and stoichiometric (1:1) destruction of the nerve agents, the lifetime of such a filter would be about 950,000 minutes. As a comparison, to achieve a similar reagent loading using alkali-impregnated granular carbon would require the use of nearly four times (approximately 467 grams) the amount of carbon.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An apparatus for chemically modifying, neutralizing and/or decontaminating chemical and/or biological contaminants from a breathable atmosphere, said apparatus comprising a filter which comprises a plurality of polymeric multilobal fibers, said fibers comprising a central core having a plurality of T-shaped lobes projecting therefrom, each of said T-shaped lobes having a leg and a cap, said lobes defining a longitudinally extending internal cavity between two adjacent legs that extends the entire length of the fiber; and which filter has been impregnated with at least one biological and/or chemical decontamination reagent in an amount sufficient to chemically modify, neutralize and/or decontaminate chemical and/or biological contaminants from a breathable atmosphere, which biological and/or chemical decontamination reagent is selected from the group consisting of acids, deliquescing agents, acetyleholinesterase, organometallic catalysts, enzymes with regenerable cofactors, cyanide carbonyls, carbonimides, substituted phosphoric acid, esters, thioethers, nitrogen heterocycles, olefinics, peroxides, peracerates, perborates, calcium hypochlorite, calcium oxide, detergents, surfactants, quaternary ammonium, complexes, photoreactive reagents, photochemical agents, and combinations thereof.

2. The apparatus of claim 1 wherein said filter has been impregnated with a liquid biological and/or chemical decontamination reagent.

3. The apparatus of claim 1 wherein said filter has been impregnated with a gas phase biological and/or chemical decontamination reagent.

4. The apparatus of claim 1 wherein said filter has been impregnated with biological and/or chemical decontamination reagent powder particles.

5. The apparatus of claim 4 wherein the biological and/or chemical decontamination reagent powder particles have been infused between said fibers and in said cavities, said powder particles being of such a size and shape that they are retained within each cavity.

6. The apparatus of claim 4 wherein the biological and/or chemical decontamination reagent powder particles range in size from about 1 micron to about 10 microns.

7. The apparatus of claim 1 wherein said filter is connected to a reservoir which contains a supply of a biological and/or chemical decontamination reagent for replenishing the reagent of the filter.

8. The apparatus of claim 7 further comprising a wicking element which extends from the filter into the reservoir and is capable of delivering a supply of a biological and/or chemical decontamination reagent from the reservoir to the filter.

9. The apparatus of claim 1 further comprising an activated carbon component connected to the filter, which activated carbon component is capable of chemically modifying, neutralizing and/or decontaminating chemical and/or biological contaminants from a breathable atmosphere.

10. The apparatus of claim 9 wherein said activated carbon component comprises activated carbon granules in a carbon bed.

11. The apparatus of claim 1 further comprising activated carbon powder particles which have been impregnated within the fibers of the filter.

12. The apparatus of claim 11 wherein said activated carbon powder particles range in size from about 1 micrometer to about 10 micrometers.

13. A self-regenerating filter system which comprises:

a) a filter which comprises a plurality of polymeric multilobal fibers, said fibers comprising a central core having a plurality of T-shaped lobes projecting therefrom, each of said T-shaped lobes having a leg and a cap, said lobes defining a longitudinally extending internal cavity between two adjacent legs that extends the entire length of the fiber; and which filter has been impregnated with at least one at least one biological and/or chemical decontamination reagent in an amount sufficient to chemically modify, neutralize and/or decontaminate chemical and/or biological contaminants from a breathable atmosphere, which biological and/or chemical decontamination reagent is selected from the group consisting of acids, deliquescing agents, acetylcholinesterase, organometallic catalysts, enzymes with regenerable cofactors, cyanide carbonyls, carbonimides, substituted phosphoric acid, esters, thioethers, nitrogen heterocycles, olefinics, peroxides, peracetates, perborates, calcium hypochlorite, calcium oxide, detergents, surfactants, quaternary ammonium complexes, photoreactive reagents, photochemical agents, and combinations thereof;

b) a reservoir connected to the filter, which reservoir contains a supply of a biological and/or chemical decontamination reagent for replenishing the reagent of the filter;

c) a wicking element which extends from the filter into the reservoir and is capable of delivering a supply of a biological and/or chemical decontamination reagent from the reservoir to the filter; and d) an optional activated carbon component connected to the filter, which activated carbon component is capable of chemically modifying, neutralizing and/or decontaminating chemical and/or biological contaminants from a breathable atmosphere.

14. The system of claim 13 wherein said filter has been impregnated with a liquid biological and/or chemical decontamination reagent.

15. The system of claim 13 wherein said filter has been impregnated with a gas phase biological and/or chemical decontamination reagent.

16. The system of claim 13 wherein said filter has been impregnated with biological and/or chemical decontamination reagent powder particles.

17. The system of claim 16 wherein the biological and/or chemical decontamination reagent powder particles have been infused between said fibers and in said cavities, said powder particles being of such a size and shape that they are retained within each cavity.

18. The system of claim 17 wherein the biological and/or chemical decontamination reagent powder particles range in size from about 1 nanometer to about 100 micrometers.

19. The system of claim 13 wherein the activated carbon component of step (d) is present.

20. The system of claim 19 wherein said activated carbon component comprises activated carbon granules in a carbon bed.

21. The system of claim 13 further comprising activated carbon powder particles which have been impregnated within the fibers of the filter.

22. The system of claim 21 wherein said activated carbon powder particles range in size from about 1 micrometer to about 10 micrometers.

23. A gas mask which comprises a filter system of claim 13.

24. A filtration arrangement for a vehicle, which vehicle has a passenger compartment containing a breathable atmosphere, said arrangement comprising a filter system of claim 13 which is connected to or positioned within the passenger compartment.

25. A filtration arrangement for a building, which building contains a breathable atmosphere, said arrangement comprising a filter system of claim 13 which is connected to or positioned within the building.

26. A process for chemically modifying, neutralizing and/or decontaminating chemical and/or biological contaminants from a breathable atmosphere, comprising the steps of:

a) providing a filter which comprises a plurality of polymeric multilobal fibers, said fibers comprising a central core having a plurality of T-shaped lobes projecting therefrom, each of said T-shaped lobes having a leg and a cap, said lobes defining a longitudinally extending internal cavity between two adjacent legs that extends the entire length of the fiber; and which filter has been impregnated with at least one biological and/or chemical decontamination reagent in an amount sufficient to chemically modify, neutralize and/or decontaminate chemical and/or biological contaminants from a breathable atmosphere; which biological and/or chemical decontamination reagent is selected from the group consisting of acids, deliquescing agents, acetylcholinesterase organometallic catalysts, enzymes with regenerable cofactors, cyanide carbonyls, carbonimides, substituted phosphoric acid, esters, thioethers, nitrogen heterocycles, olefinics, peroxides, peracetates, perborates, calcium hypochlorite, calcium oxide, detergents, surfactants, quaternary ammonium complexes, photoreactive reagents, photochemical agents, and combinations thereof;

b) passing a breathable atmosphere through the impregnated filter to thereby chemically modify, neutralize and/or decontaminate chemical and/or biological contaminants from the breathable atmosphere; and c) optionally passing the breathable atmosphere through an activated carbon component connected to the filter, which activated carbon component to thereby further chemically modify, neutralize and/or decontaminate chemical and/or biological contaminants from the breathable atmosphere.

27. The process of claim 26 wherein said filter has been impregnated with a liquid biological and/or chemical decontamination reagent.

28. The process of claim 26 wherein said filter has been impregnated with a gas phase biological and/or chemical decontamination reagent.

29. The process of claim 26 wherein said filter has been impregnated with biological and/or chemical decontamination reagent powder particles.

30. The process of claim 29 wherein the biological and/or chemical decontamination reagent powder particles have been infused between said fibers and in said cavities, said powder particles being of such a size and shape that they are retained within each cavity.

31. The process of claim 26 wherein the biological and/or chemical decontamination reagent powder particles range in size from about 1 micrometer to about 10 micrometers.

32. The process of claim 26 wherein the biological and/or chemical decontamination reagent comprises one or more materials selected from the group consisting of acids, adsorbents, activated carbon, zeolites, alumina, silica, deliquescing agents such as lithium chloride, organometallic catalysts, enzymes with regenerable cofactors such as butyrylcholinestrerase, oxidizing agents, detergents, surfactants, quaternary ammonium complexes, photochemical agents, and solvents.

33. The process of claim 26 wherein the biological and/or chemical decontamination reagent comprises one or more materials selected from the group consisting of polymethioine, cyanogen bromide, immobilized acetyicholinesterase on alumina or silica, copper/cobalt, nucleophilic oximes, lithium chloride, butyrylcholinestrerase, cyanide carbonyls, carbonimides, substituted phosphoric acid, esters, thioethers, nitrogen heterocycles, olefinics, peroxides, peracetates, perborates, calcium hypochlorite, calcium oxide, benzyltrimethyl ammonium chloride, ethyl ammonium chloride, zinc chloride, iron sulfate, sulfuric acid, phosphoric acid, titanium dioxide, water, alcohols, phenol, ethanol, diethylenetriamine and ethylene glycol monomethyl ether.

34. The process of claim 26 wherein said filter is connected to a reservoir which contains a supply of a biological and/or chemical decontamination reagent for replenishing the reagent of the filter.

35. The process of claim 34 wherein a wicking element extends from the filter into the reservoir and is capable of delivering a supply of a biological and/or chemical decontamination reagent from the reservoir to the filter.

36. The process of claim 26 wherein step (c) is conducted.

37. The process of claim 36 wherein said activated carbon component comprises activated carbon granules in a carbon bed.

38. The process of claim 26 wherein activated carbon powder particles have been impregnated within the fibers of the filter.

39. The process of claim 38 wherein said activated carbon powder particles range in size from about 1 micrometer to about 10 micrometers.

40. A process for chemically modifying, neutralizing and/or decontaminating chemical and/or biological contaminants from a breathable atmosphere, comprising the steps of:
  i) providing a self-regenerating filter system which comprises:
    a) a filter which comprises a plurality of polymeric multilobal fibers, said fibers comprising a central core having a plurality of T-shaped lobes projecting therefrom, each of said T-shaped lobes having a leg and a cap, said lobes defining a longitudinally extending internal cavity between two adjacent legs that extends the entire length of the fiber; and which filter has been impregnated with at least one biological and/or chemical decontamination reagent in an amount sufficient to chemically modify, neutralize and/or decontaminate chemical and/or biological contaminants from a breathable atmosphere; which biological and/or chemical decontamination reagent is selected from the group consisting of acids, deliquescing agents, acetylcholinesterase, organometallic catalysts, enzymes with regenerable cofactors, cyanide carbonyls, carbonimides, substituted phosphoric acid, esters, thioethers, nitrogen heterocycles, olefinics, peroxides, peracetates, perborates, calcium hypochlorite, calcium oxide detergents, surfactants, quaternary ammonium complexes, photoreactive reagents, photochemical agents, and combinations thereof;
    b) a reservoir connected to the filter, which reservoir contains a supply of a biological and/or chemical decontamination reagent for replenishing the reagent of the filter;
    c) a wicking element which extends from the filter into the reservoir and is capable of delivering a supply of a biological and/or chemical decontamination reagent from the reservoir to the filter; and
    d) an optional activated carbon component connected to the filter, which activated carbon component is capable of chemically modifying, neutralizing and/or decontaminating chemical and/or biological contaminants from a breathable atmosphere;
  ii) passing a breathable atmosphere through the impregnated filter and optionally through the activated carbon component, if present, to thereby chemically modify, neutralize and/or decontaminate chemical and/or biological contaminants from the breathable atmosphere;
  iii) replenishing the reagent of the filter by equilibrating the flow, level, or concentration of the biological and/or chemical decontamination reagent between the reservoir and the filter via the wicking element; and
  iv) optionally repeating steps (ii) and/or (iii) until the biological and/or chemical decontamination reagent of the reservoir has been exhausted.

41. The process of claim 40 wherein steps (ii) and/or (iii) are repeated until the biological and/or chemical decontamination reagent of the reservoir has been exhausted.

42. The process of claim 40 wherein the activated carbon component of step (d) is present.

43. The process of claim 42 wherein said activated carbon component comprises activated carbon granules in a carbon bed.

44. The process of claim 42 wherein the breathable atmosphere is passed through the activated carbon component in step (d).

45. The process of claim 40 wherein activated carbon powder particles have been impregnated within the fibers of the filter.

46. The process of claim 45 wherein said activated carbon powder particles range in size from about 1 micrometer to about 10 micrometers.

47. The apparatus of claim 1 wherein the biological and/or chemical decontamination reagent is selected from the group consisting of lithium chloride, polymethioine, cyanogen bromide, copper/cobalt, nucleophilic oximes, butyrylcholinesterase, benzyltrimethyl ammonium chloride, ethyl ammonium chloride, zinc chloride, iron sulfate, sulfuric acid, phosphoric acid, titanium dioxide, anatase titanium dioxide, and combinations thereof.

48. The self-regenerating filter system of claim 13 wherein the biological and/or chemical decontamination reagent is selected from the group consisting of lithium chloride, polymethioine, cyanogen bromide, copper/cobalt, nucleophilic oximes, butyrylcholinesterase, benzyltrimethyl ammonium chloride, ethyl ammonium chloride, zinc chloride, iron sulfate, sulfuric acid, phosphoric acid, titanium dioxide, anatase titanium dioxide, and combinations thereof.

49. A gas mask which comprises a self-regenerating filter system comprising:
  a) a filter which comprises a plurality of polymeric multilobal fibers, said fibers comprising a central core having a plurality of T-shaped lobes projecting therefrom, each of said T-shaped lobes having a leg and a cap, said lobes defining a longitudinally extending internal cavity between two adjacent legs that extends the entire length of the fiber; and which filter has been impregnated with at least one biological and/or chemical decontamination reagent in an amount sufficient to chemically modify, neutralize and/or decontaminate chemical and/or biological contaminants from a breathable atmosphere; b) a reservoir connected to the filter, which reservoir contains a supply of a biological and/or chemical decontamination reagent for replenishing the reagent of the filter;
  c) a wicking element which extends from the filter into the reservoir and is capable of delivering a supply of a biological and/or chemical decontamination reagent from the reservoir to the filter; and
  d) an optional activated carbon component connected to the filter, which activated carbon component is capable of chemically modifying, neutralizing and/or decontaminating chemical and/or biological contaminants from a breathable atmosphere.

* * * * *